UNITED STATES PATENT OFFICE.

GEORGE M. LITTLE, OF PITTSBURGH, PENNSYLVANIA, ASSIGNOR TO WESTINGHOUSE ELECTRIC & MANUFACTURING COMPANY, A CORPORATION OF PENNSYLVANIA.

ARC-LAMP ELECTRODE.

1,075,484.  Specification of Letters Patent.  Patented Oct. 14, 1913.

No Drawing.  Application filed January 5, 1907.  Serial No. 351,019.

*To all whom it may concern:*

Be it known that I, GEORGE M. LITTLE, a citizen of the United States, and a resident of Pittsburgh, in the county of Allegheny and State of Pennsylvania, have invented a new and useful Improvement in Arc-Lamp Electrodes, of which the following is a specification.

My invention relates to arc lamp electrodes, and particularly to those composed of materials that render the arc more luminous and the electrodes less readily consumable than ordinary carbons.

The object of my invention is to provide an electrode of this character that is especially adapted for use in alternating current circuits.

A composition electrode that has been found suitable in lamps supplied with direct current comprises magnetic oxid of iron ($Fe_3O_4$), which is usually the predominant constituent and which gives conductivity to the slag that forms upon the end of the electrode both when hot and when cold, chromium oxid ($Cr_2O_3$), which, by reason of its very high fusing point, assists in preventing rapid consumption of the electrode and flickering of the arc, and titanium oxid ($TiO_2$) which imparts color and brilliancy to the arc and also assists in extending the life of the electrode. If desired, the magnetic oxid of iron may be replaced by any other suitable conducting metallic oxid or compound, which, after having been fused, is a reasonably good conductor and therefore imparts conductivity to the slag that forms upon the end of the electrode, though the former will be preferable in most cases, principally because of its cheapness. This electrode is usually employed as the cathode of a lamp, in combination with a copper or other suitable metallic anode, the latter being very slowly consumed by the arc. The use of such an electrode in a lamp supplied with alternating current, however, is impracticable because of the extremely unsteady, flickering arc produced thereby and, in order to obviate the unsteadiness and flickering of the arc, I propose to combine potassium silicate ($K_2SiO_3$), in suitable proportions, with the above named constituents, which I have found to be entirely satisfactory for the purpose. The potassium silicate may be added in the form of commercial potassium silicate, or it may be added in the form of ordinary silicate sand and potassium carbonate ($K_2CO_3$), or another suitable salt of potassium. While I prefer to employ potassium silicate as the steadying agent, I have also found that potassium cyanid (KCN), potassium chlorid (KCl), potassium fluorid (KFl), and other salts of potassium and other alkaline metals are also satisfactory, though to a lesser degree.

The particular composition which I prefer to employ is made up as follows: Sixty parts of magnetic oxid of iron ($Fe_3O_4$), 27 parts of titanium oxid ($TiO_2$), 6 parts of ferrous chromite ($Cr_2O_3.FeO$), 12 to 15 parts of potassium silicate ($K_2SiO_3$), though if these constituents are combined in other proportions satisfactory results may still be obtained.

I claim as my invention:

1. An electrode containing ferric material and a silicate of an alkaline metal.
2. An electrode containing a metallic oxid and a silicate of an alkaline metal.
3. An electrode containing a conducting metallic oxid and a silicate of an alkaline metal.
4. An electrode containing iron oxid and a silicate of an alkaline metal.
5. An electrode containing iron oxid and potassium silicate.
6. An electrode containing a conducting metallic oxid and potassium silicate.

In testimony whereof, I have hereunto subscribed my name this 31st day of December, 1906.

GEORGE M. LITTLE.

Witnesses:
 OTTO S. SCHAIRER,
 BIRNEY HINES.